(12) United States Patent
Mahanta et al.

(10) Patent No.: US 11,842,175 B2
(45) Date of Patent: Dec. 12, 2023

(54) DYNAMIC RECOMMENDATIONS FOR RESOLVING STATIC CODE ISSUES

(71) Applicant: SAP SE, Walldorf (DE)

(72) Inventors: Prabal Mahanta, Bangalore (IN); Vipul Khullar, New Delhi (IN)

(73) Assignee: SAP SE, Walldorf (DE)

( * ) Notice: Subject to any disclaimer, the term of this patent is extended or adjusted under 35 U.S.C. 154(b) by 189 days.

(21) Appl. No.: 17/379,225

(22) Filed: Jul. 19, 2021

(65) Prior Publication Data

US 2023/0016697 A1 Jan. 19, 2023

(51) Int. Cl.
G06F 8/41 (2018.01)
G06F 8/73 (2018.01)
G06F 8/75 (2018.01)

(52) U.S. Cl.
CPC ............. *G06F 8/42* (2013.01); *G06F 8/433* (2013.01); *G06F 8/437* (2013.01); *G06F 8/73* (2013.01); *G06F 8/75* (2013.01)

(58) Field of Classification Search
CPC ....................................................... G06F 8/42
USPC ....................................................... 717/143
See application file for complete search history.

(56) References Cited

U.S. PATENT DOCUMENTS

| | | | | |
|---|---|---|---|---|
| 10,789,150 B2* | 9/2020 | Keinan | ............... | G06F 11/3624 |
| 10,936,468 B1* | 3/2021 | Ochlak | ............... | G06F 8/75 |
| 11,157,246 B2* | 10/2021 | Zhang | ............... | G06N 3/08 |
| 11,157,384 B2* | 10/2021 | Carranza | ............... | G06F 8/437 |
| 11,269,597 B2* | 3/2022 | Haze | ............... | G06N 20/00 |
| 11,392,844 B1* | 7/2022 | Rao | ............... | G06N 20/00 |
| 11,409,633 B2* | 8/2022 | Das | ............... | G06F 11/3608 |
| 11,416,622 B2* | 8/2022 | Sharma | ............... | G06N 7/01 |
| 11,455,161 B2* | 9/2022 | Prasad | ............... | G06F 18/214 |
| 11,573,785 B2* | 2/2023 | Copty | ............... | G06N 3/084 |
| 11,604,642 B2* | 3/2023 | Jayapandy | ............... | G06N 5/04 |

(Continued)

FOREIGN PATENT DOCUMENTS

WO WO-2022108717 A1 * 5/2022 ............. G06N 3/0445

OTHER PUBLICATIONS

B. Arora, S. VC, G. R. Dheemanth, M. Thakral and N. Kumar, "Code Semantic Detection," 2021 Asian Conference on Innovation in Technology (ASIANCON), Pune, India, 2021, pp. 1-6, doi: 10.1109/ASIANCON51346.2021.9544660.*

(Continued)

*Primary Examiner* — Francisco J Aponte
(74) *Attorney, Agent, or Firm* — Buckley, Maschoff & Talwalkar LLC

(57) ABSTRACT

According to some embodiments, systems and methods are provided, comprising receiving a code fragment exhibiting a static code issue; determining, via a trained exemption neural network, whether the received code fragment is exempt or not exempt from resolution; in a case it is not exempt, inputting the code fragment to a trained classification neural network; determining whether the static code issue is a syntactical static code issue or a non-syntactical static code issue; in a case it is a syntactical static code issue, inputting the code fragment to a first trained network to generate a first resolution; and in a case the static code issue is a non-syntactical static code issue, inputting the code fragment to a second trained network to generate a second resolution of the non-syntactical static code issue. Numerous other aspects are provided.

20 Claims, 12 Drawing Sheets

(56) References Cited

U.S. PATENT DOCUMENTS

| | | | | |
|---|---|---|---|---|
| 11,604,719 B2* | 3/2023 | Clement | ............ | G06F 11/3636 |
| 2017/0212829 A1* | 7/2017 | Bales | ................. | G06F 11/3604 |
| 2019/0108001 A1* | 4/2019 | Hauser | ............... | G06F 11/3668 |
| 2019/0228319 A1* | 7/2019 | Gupta | ..................... | G06N 5/04 |
| 2019/0317879 A1* | 10/2019 | McCormick | ............ | G06N 3/08 |
| 2020/0097389 A1* | 3/2020 | Smith | ................. | G06F 11/0793 |
| 2020/0183818 A1* | 6/2020 | Guenther | ........... | G06F 11/3664 |
| 2020/0349052 A1* | 11/2020 | Wehr | ..................... | G06F 8/427 |
| 2021/0191715 A1* | 6/2021 | Samudrala | ............. | G06N 20/00 |
| 2021/0311729 A1* | 10/2021 | Gupta | ................... | G06N 3/045 |
| 2021/0405980 A1* | 12/2021 | Ghosh | ...................... | G06F 8/51 |
| 2022/0300835 A1* | 9/2022 | Ghosh | ...................... | G06F 8/10 |
| 2022/0374208 A1* | 11/2022 | Allamanis | ............. | G06N 3/045 |

OTHER PUBLICATIONS

Rijnard van Tonder and Claire Le Goues. 2018. Static Automated Program Repair for Heap Properties. In ICSE '18: ICSE '18: 40th International Conference on Software Engineering, May 27-Jun. 3, 2018, Gothenburg, Sweden. ACM, New York, Ny, USA, 12 pages. https://doi.org/10.1145/3180155.3180250.*

* cited by examiner

FIG. 8

DYNAMIC RECOMMENDATIONS FOR RESOLVING STATIC CODE ISSUES

BACKGROUND

Static code analysis is a method of debugging computer code by examining source code before a program is run. It is often done by analyzing a set of code against a set (or multiple sets) of coding rules. Static code analysis tools may identify patterns in the code and detect possible security threats and issues in the quality of the code. A problem with static code analysis is that a lot of time may be spent by developers to find solutions to the issues and there may not be enough trained personnel to thoroughly conduct static code analysis. Further, while automated tools are available, they may only be as good as the rules they are using to scan the code, and therefore may provide a false sense of security that every issue is being addressed.

Systems and methods are desired which provide a more efficient static code analysis process.

BRIEF DESCRIPTION OF THE DRAWINGS

FIG. 8 is an example of a User Interface according to some embodiments.

DETAILED DESCRIPTION

Figure 1:
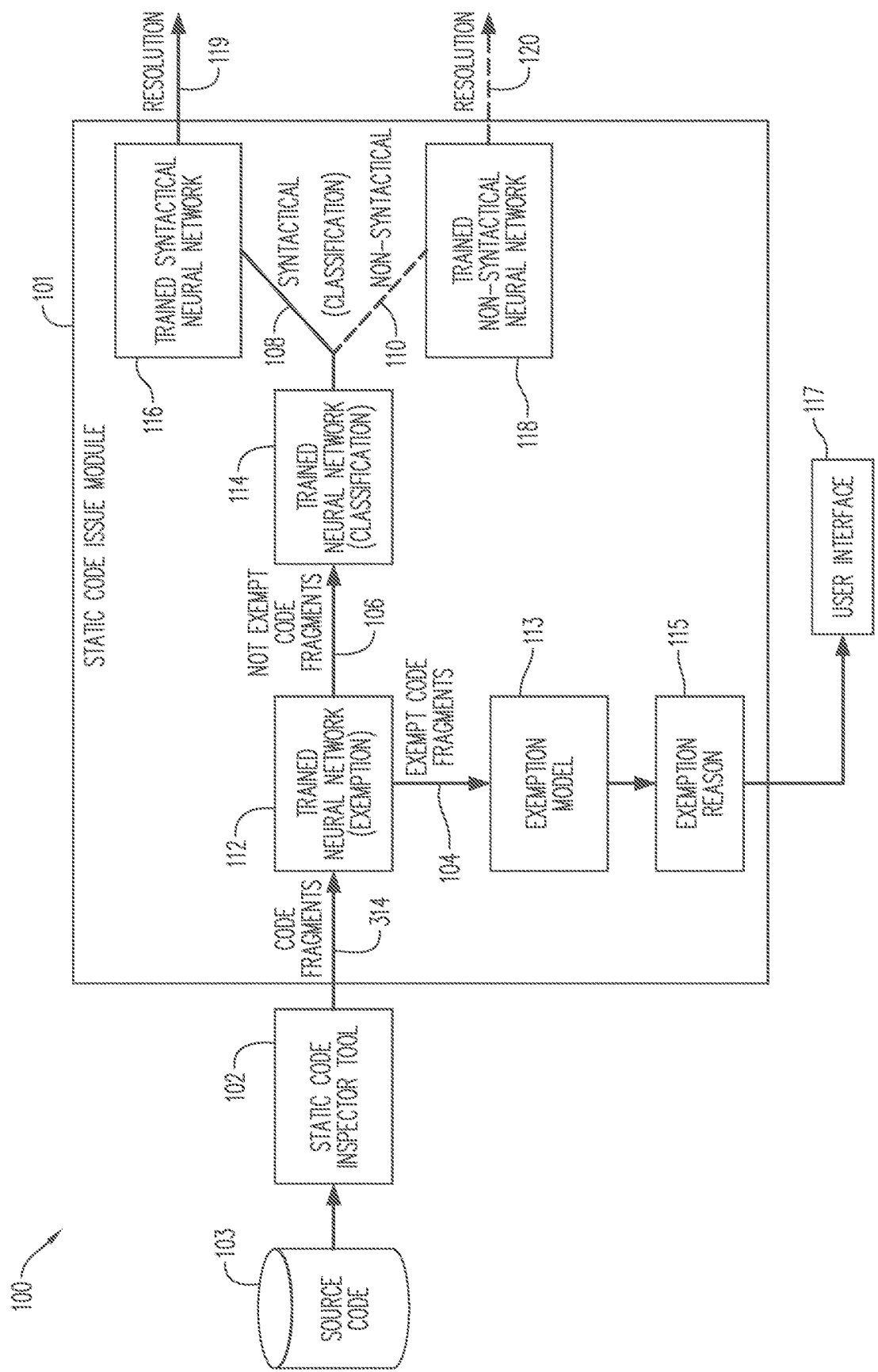
FIG. 1 illustrates an architecture that uses a plurality of trained networks according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

In software development projects, resolution of static code issues and warnings, even via a Static Code Inspector (SCI) tool, may be an additional effort as a lot of time may be spent by developers to find the solutions to the static code issues. While many SCI tools may provide analysis and static help for issues, dynamically learned solutions may not be available. Additionally, current SCI tools may not consider issues which are not intended to be solved, but instead have exemptions (e.g., auto-generated code or issues where resolution of the issue provides no added value).

One or more embodiments provide a static code issue module to determine whether a static code issue exhibited by a code fragment is exempt from finding a resolution, and if the static code issue is not exempt, to classify it as a syntactical issue or a non-syntactical issue, and then to provide dynamic suggestions to resolve the issue based on how the issue has been resolved in the past using a machine learning paradigm. Embodiments may also provide an estimated time frame to resolve the issue.

Exemptions may be, for example, auto-generated code or issues which provide no additional value. Syntactical issues are static code issues that are programming language grammar related (e.g., related to obsolete statements and others). The syntactical issues may have resolutions involving only syntactical changes (e.g., changes related to language grammar like obsolete statements, naming changes, unused variables, etc.) In one or more embodiments, non-syntactical issues are static code issues that may be program structure related (e.g., related to code complexity). Non-syntactical code issues may have resolutions involving program structure changes (e.g., changes related to code complexity like nested conditions, select inside loop, etc.).

As a non-exhaustive example, the issue may be syntactical in that a variable name has changed between a first version and a second version. The static code issue module may use a differentiator tool to determine the different variable name. Then, the static code issue module may notify a user of the difference and/or may automatically replace the variable throughout the code. As another non-exhaustive example, take the case where a new programming paradigm or syntax is introduced in a programming language. The issue correction module may highlight all of the places in the existing code where the old paradigm is being used, and then may recommend replacing the old paradigm with the new paradigm or may automatically make the replacement. This may be helpful when migrating from an old to a new paradigm.

Some embodiments utilize a trained artificial neural network to facilitate effective and efficient resolution of static code issues. Such a network may be a classifier and may be trained based on features extracted from prior code fragments exhibiting issues and corresponding resolutions. A network according to some embodiments may be used to generate a resolution based on an input code fragment and may be incorporated into existing review workflow and/or development environments. Embodiments may therefore increase the quality of, and reduce the time and resources required for, code review. Embodiments may generate and display the best possible resolution (or most used resolution) to the developer by analyzing past resolutions of the issue.

FIG. 1 illustrates deployment of a trained neural network according to some embodiments. Embodiments are not limited to the FIG. 1 deployment. Deployment of a trained neural network generally comprises implementing the learned algorithm embodied by the trained network in a computing device as is known in the art. Such implementation may include copying of the hyperparameters of the trained network and the learned parameter values/kernels to the computing device.

System 100 of FIG. 1 is a software development environment. A user may access the static code issue module 101 executed by application server 940 (FIG. 9), which may comprise an on-premise or cloud-based server.

In one example, application server 940 (FIG. 9) includes program code implementing neural networks 112, 114, 116, 118 trained as described below.

Figure 2:
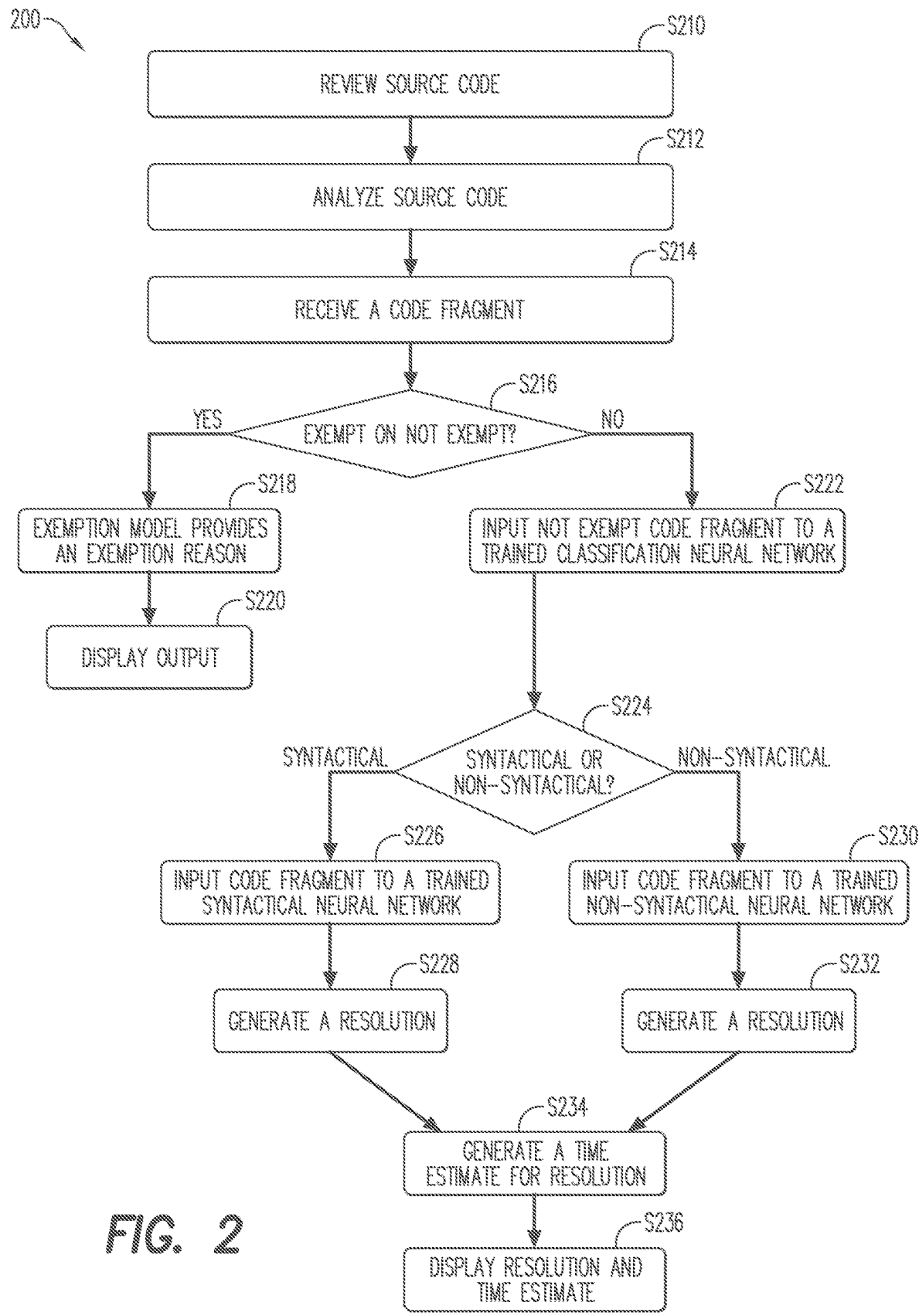
FIG. 2 is a flow diagram of a process according to some embodiments.

FIG. 2 describes a process 200 for analyzing a code fragment. Process 200 may be executed by application server 940 (FIG. 9) according to some embodiments. In one or more embodiments, the application server 940 (FIG. 9) may be conditioned to perform the process 200, such that a processor 1110 (FIG. 11) of the application server 940 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210 source code 103 for an application is received at a static code inspector tool 102. The static code inspector tool 102 may, at S212, analyze the source code 103 to determine security flaws ("static code issues") exhibited by any code fragments 314 in the source code. The static code issue module 101 may receive, at S214, a code fragment 314 exhibiting a static code issue, as determined by the static code inspector tool 102. A trained exemption neural network model 112 determines whether the code fragment 314 is exempt from resolution 104 or not exempt from resolution 106 at S216.

Figure 10:
FIG. 10 is a table according to some embodiments.

In one or more embodiments, an exempt code fragment 104 is a static code issue that does not need to be resolved. Exemption neural network 112 may have been trained, as described further below with respect to FIGS. 3A-5, to determine whether a code fragment 314 is exempt or not exempt. As the developers determine which static code issues are associated with exempt, this data is used to train the exemption neural network such that the exemption neural network learns which type of objects exempt and which type of objects are not exempt. In some embodiments, a table 1000, as shown in FIG. 10, may store the object type as well as the exemption reasons as a result set.

In a case it is determined at S216 that the code fragment is exempt, the process 200 may proceed to S218 and an exemption model 113 may analyze the code fragment to provide an exemption reason 115. As part of the analysis, data elements of existing parameters of code semantics extracted in json schema may be used to find other tables for which a single record can be determined using the existing parameter values. The fields of the newly determined tables may then be checked for fixed value domains. If the fields are found to be containing only fixed values, then they would be tried for improvising the model for predicting the exemption reasons. For example, if the code of interest leads to similar results and doesn't detect any exemption, despite the case is otherwise, then the model may be improvised to detect the same for the current and future cases. Next, the exemption reason 115 may be rendered and displayed on a user interface 117 in S220. For example, the exemption reason may be provided to a front-end user interface to display to a user.

In a case it is determined at S216 the code fragment is not exempt from resolution 106, the process proceeds to S222 and the not exempt code fragment 106 is input to a trained classification neural network model 114. Next, at S224, the trained classification neural network 114 determines whether the static code issue exhibited by the not exempt code fragment 106 is a syntactical static code issue 108 or a non-syntactical static code issue 110. In a case the trained classification neural network determines at S224 the static code issue exhibited by the code fragment is a syntactical static code issue, the code fragment 106 is input to a trained syntactical neural network model 116 at S226 and generates a resolution of the syntactical static code issue at S228. In a case the trained classification neural network determines at S224 the static code issue exhibited by the code fragment is a non-syntactical static code issue, the code fragment 106 is input to the trained non-syntactical neural network model 118 at S230 to generate a resolution for the non-syntactical static code issue at S232. In one or more embodiments, after a resolution is generated at S228 and S232, the static code issue module 101 may generate an estimated time to incorporate the resolution for each provided resolution in S234. Next, the one or more resolutions and time estimates may be provided to a front-end user interface 117 to display to a user in S236.

Figure 3A:
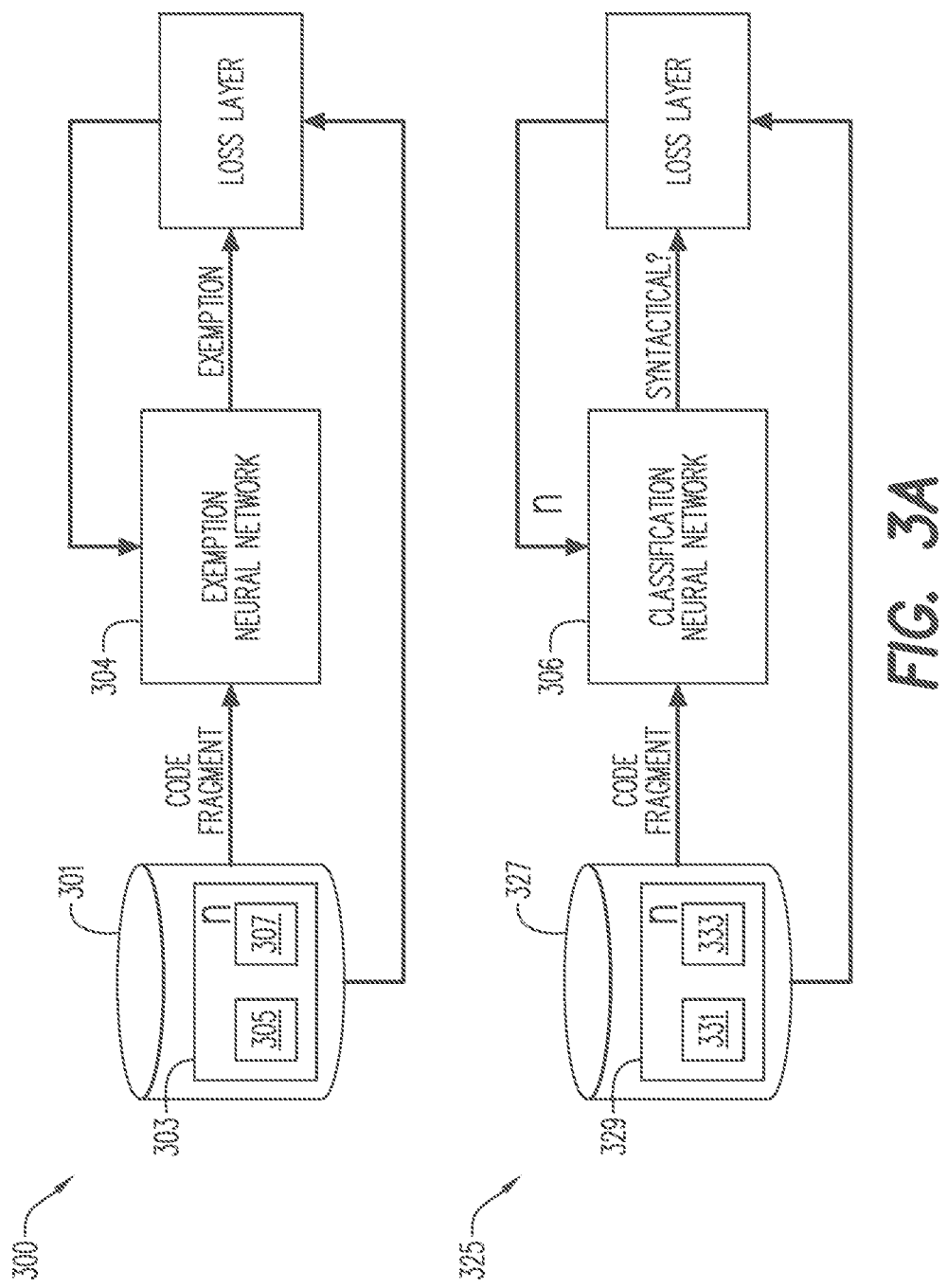
FIG. 3A illustrates a plurality of systems to generate training data according to some embodiments.
Figure 3B:
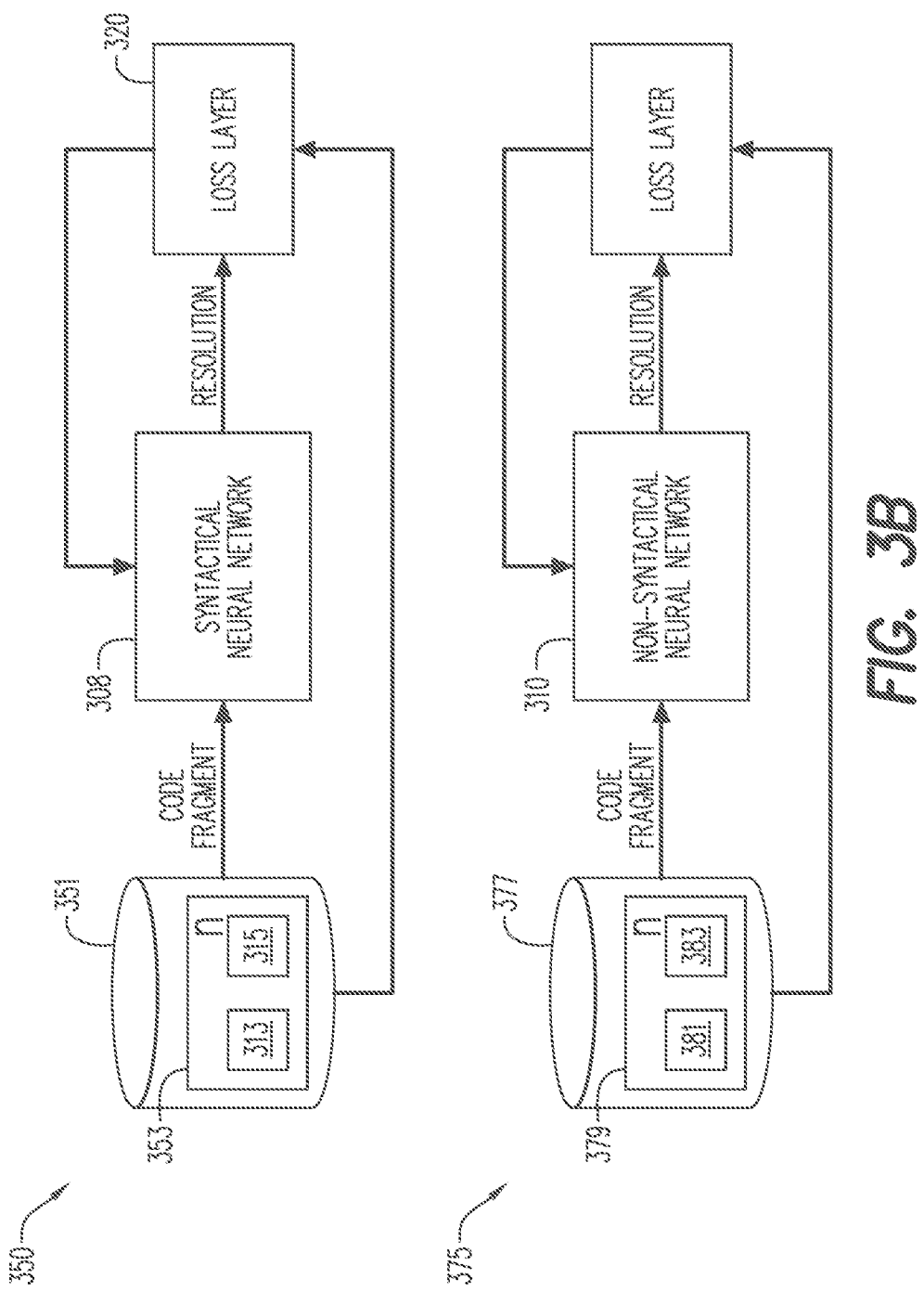
FIG. 3B illustrates a plurality of systems to generate training data according to some embodiments.
Figure 4:
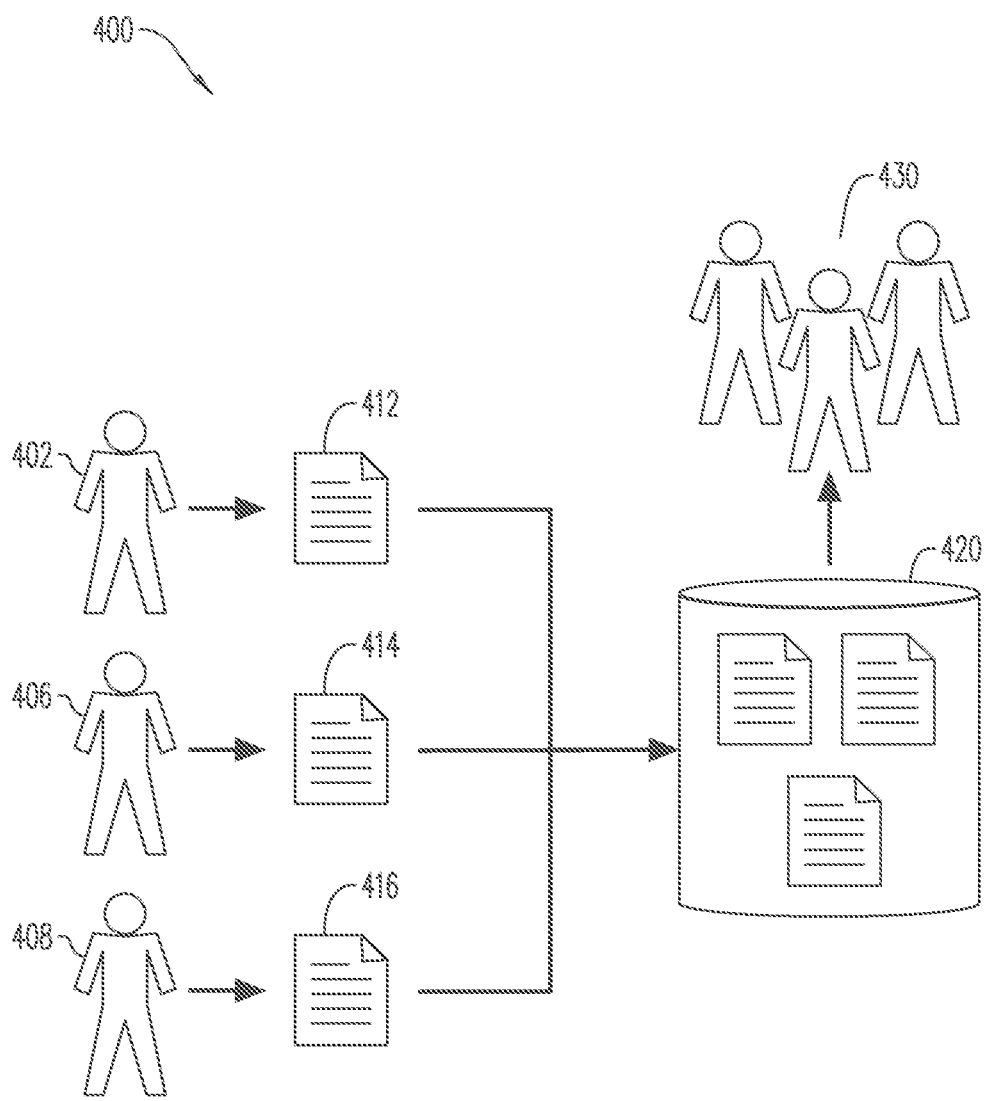
FIG. 4 illustrates a development architecture for a system according to some embodiments.

FIGS. 3A and 3B illustrate systems 300 (FIG. 3A), 325 (FIG. 3A), 350 (FIG. 3B) and 375 (FIG. 3B) for training a static code issue module 101 according to some embodiments.

Each neural network may comprise a network of neurons which receive input, change internal state according to that input, and produce output depending on the input and the internal state. The output of certain neurons is connected to the input of other neurons to form a directed and weighted graph. The weights as well as the functions that compute the internal state can be modified by a training process based on ground truth data as is known in the art. The neural networks may comprise any one or more types of suitable artificial neural network that are or become known, including but not limited to convolutional neural networks, recurrent neural networks, long short-term memory networks, deep reservoir computing and deep echo state networks, deep belief networks, and deep stacking networks.

FIG. 3A illustrates training of exemption neural network 304, and classification neural network 306, while FIG. 3B illustrates training of a syntactical neural network 308 and a non-syntactical neural network 310 and. The following will describe the training of a single neural network, and in particular the syntactical neural network 308.

Training data 351 comprises n sets 353, where each set 312 includes a code fragment 313 exhibiting a syntactical static code issue and a corresponding resolution 315. The resolution 315 associated with each "syntactical" code fragment may have been generated by a conventional static code issue resolution process as described with respect to FIG. 4, to which embodiments are not limited.

System 400 may comprise a conventional development architecture. Developers 402, 406 and 408 execute developed code in combination with a static code inspector tool 102 (FIG. 1) and receive code fragments representing static code issues 412, 414 and 416 therefrom. Static code issues exhibited by code fragments 412, 414 and 416 are submitted (or committed) to central repository 420 as is known in the art.

Central repository 420 may be on-premise or cloud-based and may be managed by a single application provider to ensure compliance with internal and general coding standards and policies.

In embodiments, Reviewers 430 generate resolutions for each reviewed code fragment in repository 420. In one or more embodiments, the Reviewer 430 may first classify each code fragment as being exempt from resolution or not exempt from resolution. Then for each non-exempt code fragment 106, the Reviewers 430 may classify each code fragment as exhibiting a syntactical static code issue or as exhibiting a non-syntactical static code issue.

One or more embodiments may determine training data for these networks (i.e., the ground truth resolution corresponding to a given code fragment). For example, the classification neural network 306 described by embodiments may be trained by analyzing the changes in program structure and language grammar for each successful resolution of a static code issue. Similarly, for the other neural networks described herein, once the network model is built, dependency charts may be created to be used in future use cases. It is noted that initially, the neural network may use one or more pre-defined metrics to compare the "before" and "after" code of past issues and resolutions to identify an issue and resolution to train the neural network.

In the parlance of neural network training, each resolution 315 is considered ground truth data corresponding to a respective one of code fragments 313. In one or more embodiments, the sets 353 may be stored in a database, or any other suitable store. The various data sources may be locally stored or reside remote from a static code issue model creation computer. Moreover, various devices described herein might be combined according to embodiments of the present invention.

During training, a feature extractor 906 (FIG. 9) extracts features 907 from each of the code fragments representing a static code issues and inputs those feature code fragments into the neural network. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc.

The type and number of features extracted from the code fragment may be optimized using domain-knowledge and/or a feature discovery process. Based on its initial configuration and design, the neural network 308 outputs a predicted resolution for a syntactical issue. Loss layer component 320 determines a loss by comparing the predicted resolution generated based on a given input code fragment 313 with the actual resolution 315 associated with the code fragment within the sets of code fragments-resolutions 353. A loss is determined for each input code fragment 313 in order to determine a total loss. The loss may comprise an L1 loss, and L2 loss, or any other suitable measure of total loss known in the art.

The total loss is backpropagated from loss layer component 320 to the neural network 308. As is known in the art, the internal weights of the neural network 308 are modified in response to the total loss. The foregoing process repeats until it is determined that the total loss has reached an acceptable level or training otherwise terminates.

At termination of the training, the trained neural network may be a trained network model including information about a decision boundary created via the supervised learning. The decision boundary may be a boundary that separates the input code fragments representing static code issues into particular categories (e.g., type of resolution). Thus, a decision boundary may be automatically calculated for a model using supervised learning. According to some embodiments, the decision boundary might be associated with a line, a hyperplane, a non-linear boundary separating one category from another category, and/or a plurality of decision boundaries. Moreover, a decision boundary might comprise a multi-class decision boundary separating multiple categories.

System 300, 325, 350 and 375 may comprise any system or systems for training an artificial neural network that are or become known. For example, any of training system 300, 325, 350, 375 may employ supervised learning, unsupervised learning and/or reinforcement learning used as a function approximator as is known in the context of deep neural networks. Generative adversarial networks may be used including a generative and a discriminative network as is known.

According to some embodiments, each trained neural network may implement a function. The function may be characterized as a set of parameter values associated with each node of the network. In one example, the function is represented by parameter values of kernels of a fully convolutional network. The function (e.g., embodied in parameter values of trained convolutional kernels) may be deployed as is known in the art to another system.

The system 375 for training the non-syntactical neural network 310 may train the non-syntactical neural network 310 to output a trained non-syntactical neural network model, in a similar manner to that described above with respect to the training of the syntactical neural network 308. The training of the non-syntactical neural network 310 may use different inputs than the syntactical neural network 308, and result in different outputs. Notably, the input to the non-syntactical neural network 310 may be training data 377 comprising n sets 379 of static code issues-resolutions in the form of code fragments representing non-syntactical static code issues 381 and resolutions 383. The model output from the non-syntactical neural network 310 may be operative to distinguish types of non-syntactical issues.

The system 325 for training the classification neural network 306 may train the classification neural network 306 to output a trained classification neural network model, in a similar manner to that described above with respect to the training of the syntactical neural network 308. The training of the classification neural network 306 may use different inputs than the syntactical neural network 308, and result in different outputs. Notably, the input acquired by the classification neural network 306 may be training data 327 comprising n sets 329 of static code issues in the form of code fragments 331 representing syntactical and non-syntactical static code issues and a flag 333 to identify each fragment as one of syntactical or non-syntactical. With respect to this neural network, the identification is the resolution of the question as to the type of issue, and may be the output of the model resulting from the training of the classification neural network.

The system 300 for training the exemption neural network 304 may train the exemption neural network 304 to output a trained exemption neural network model, in a similar manner to that described above with respect to the training of the syntactical neural network 308. The training of the exemption neural network 304 may use different inputs than the syntactical neural network 308, and result in different outputs. Notably, the input to the exemption neural network 304 maybe training data 301 comprising n sets 303 of static code issues and in the form of code fragments 305 representing exemption and non-exemptions and a flag 307 to identify each fragment as one of exempt or not exempt. With respect to this neural network, the identification is the resolution of the question of whether the static code issue is exempt, and may be the output of the model resulting from the training of the exemption neural network.

One or more embodiments may include the following steps for effort estimation, where effort estimation is the number of lines of code that would be changed and the time needed to test the changes. First there may be pre-processing of the code fragment data based on one or more metrics. Non-exhaustive examples of the metrics are code coupling and inheritance. Then the available historical data provided by the module related to code heuristics represented by grammar data may be binarized, such that the framework can learn from human input if the recommendation doesn't work. Next, the training and testing data may be separated from each other, and the regression model is trained on the training data. The test data may then be fit to the trained model. The test results may be returned to be displayed on a Front-End User Interface.

Figure 5:
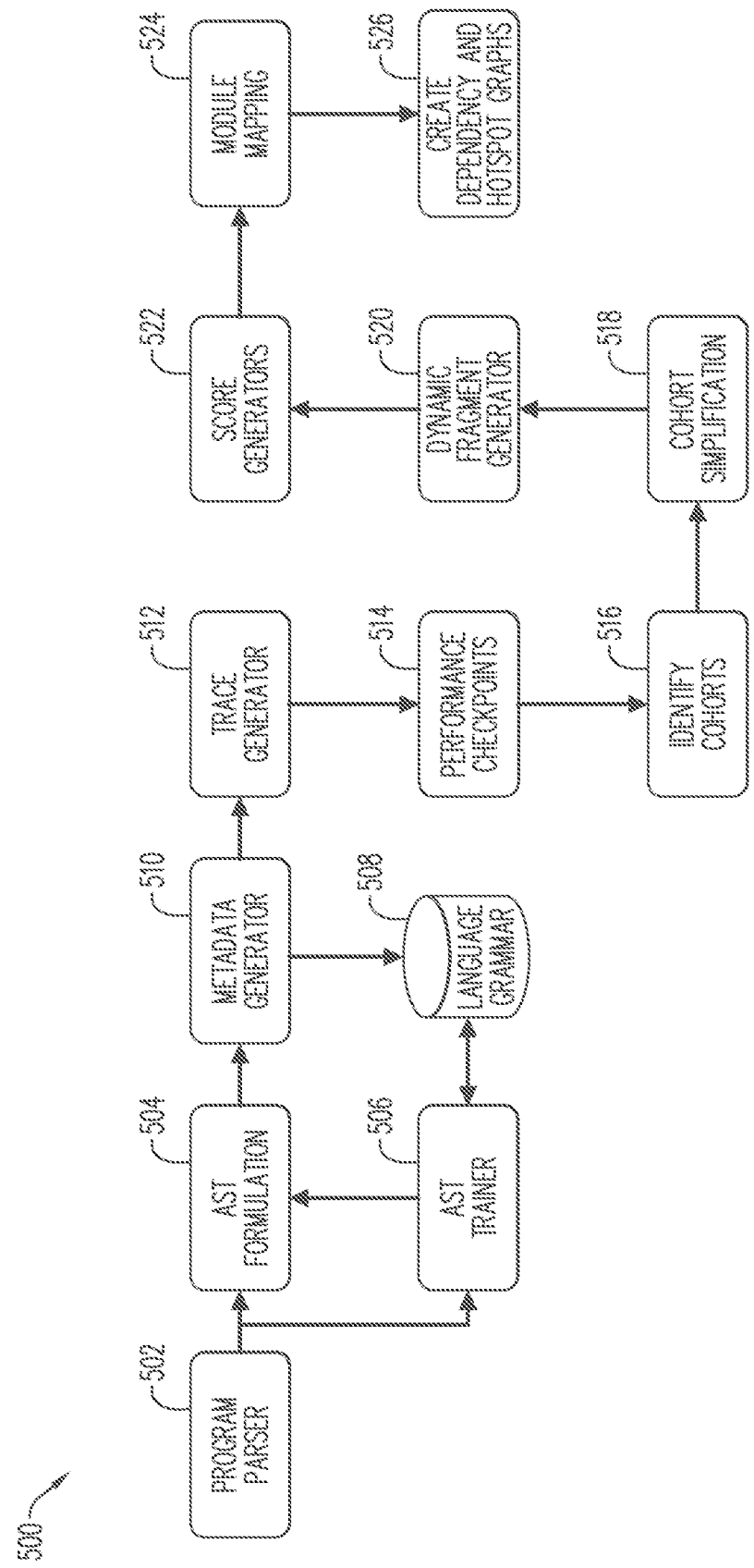
FIG. 5 illustrates a block diagram according to some embodiments.

FIG. 5 may provide a workflow of the transformation of the source code fragments to vectors and their use in the creation of dependency and hotspot graphs via a plurality of modules. FIG. 5 may prepare the foundation of learning from tests/experiments for the end outcome of recommending appropriate changes. A program parser 502 may receive the application including the code having the issue. The program parser 502 may output a semantic structure comprising of lexical elements, context-free syntax, and context-sensitive syntax. The output may be in the form of a token in a scheme where the expression is represented in JSON format. An Abstract Syntax Tree (AST) formulation 504 may improve the JSON schema and final JSON using an AST Trainer 506. The AST Trainer may optimize the existing knowledge present in a language grammar database 508 using tags and chunking the JSON structure in the HANA database. The AST Trainer 506 may use the JSON schema to analyze similarity and uniqueness of the structure with existing information and may update the same.

A metadata generator 510 may extract the semantic information and tags and store the optimized AST information or update the existing knowledge in the database. A trace generator 512 may perform the runtime performance measurement and may update the JSON with information about each section of the code with performance numbers. These sections may then be identified as checkpoints 514 by the representation using tags in the JSON schema. An Identify Cohorts 516 may form groups of the runtime performance measurement. A new variant of JSON may be used with schema only containing tags, source, section and measurement information. The cohort simplification 518 may identify existing knowledge to map similarities for improvement. The output of the cohort simplification 518 may be an update to the JSON schema. A dynamic fragment generator 520 may classify and update the JSON from cohort simplification step with actual recommendations and corrections where possible. This may be a supervised step where an expert may check if the recommendation works or not.

A score generator 522 may update the scoring in the knowledge database based on the supervised step where similarity index code is captured. A module mapping 624 may, using the recommendation knowledge, map the existing optimizations form the knowledge database with the code fragments that need optimizations. This may also include an update in the JSON. The hotspot generators and dependency generator 526 may provide a visual indicator of the overall process using either a circus Plot (Dependency) per code chunk/fragment/method or a hotspot map indicating all classes with intensity based on performance improvement needs and also faults if the knowledge exists.

It is noted that in taking the language grammar for all languages, there may be a need to train the neural network to enable the system to understand the variation from syntax and style point of view. In one or more embodiments, the neural network may be trained with best practices from a language perspective so that in a case there are similarities with languages it may become easier to tag and prevent over-processing (and thereby decrease computational costs).

Figure 6:
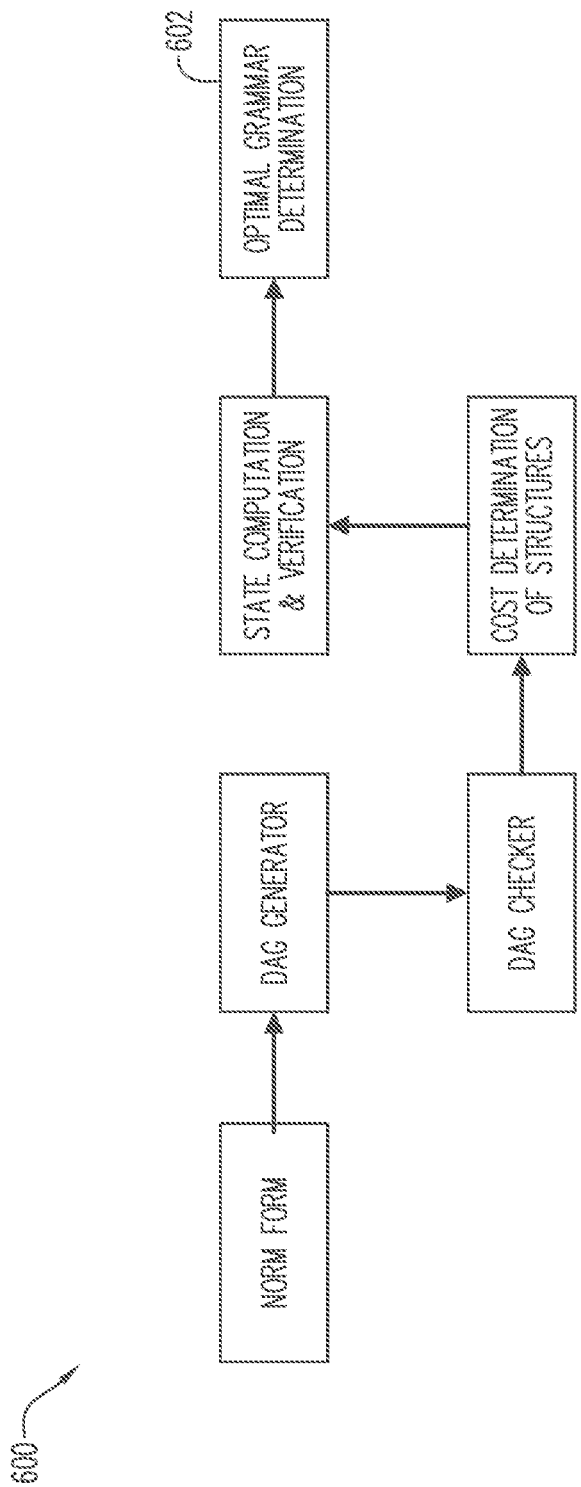
FIG. 6 illustrates a block diagram further describing one of the blocks of FIG. 5 according to some embodiments.

To that end, for example, the metadata generator 510 may include an intermediate process 600 resulting in representation (e.g., subgraph) of the code fragment by way of a final directed acyclic graph (DAG) 602, as shown in FIG. 6. To derive the optimal grammar representation (final DAG), first the optimal representation for a local case is derived and then this is extended to the global case. In one or more embodiments, the optical grammar representation may be for historical knowledge and may keep getting updated based on the current code block analysis. One code block is the outcome of the current analysis which may influence the optical grammar representation by enhancing the knowledge.

To extend this further to a multicore architecture, kernel optimization techniques may be evaluated along with a recommendation-based thread management to make sure not all threads are writing to one code block. The recommendation-based thread management may prevent the framework from creating multiple recommendations, and therefore not create multiple code fragment versions writing to the same code block.

Figure 7:
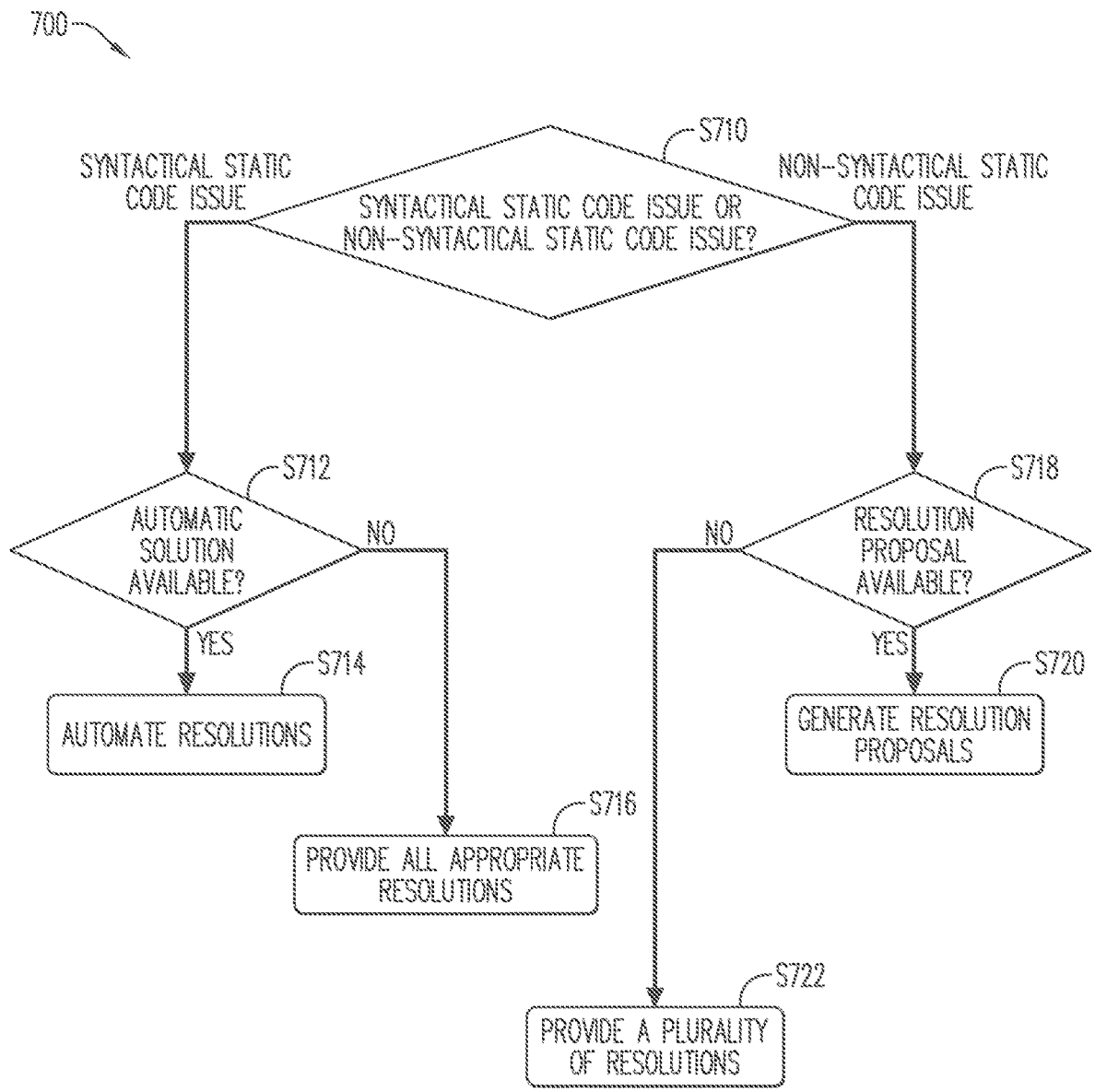
FIG. 7 is a flow diagram of a process according to some embodiments.

FIG. 7 includes a flow diagram of a process 700 to further classify the static code issues. In one or more embodiments, each static code issue represented by code fragments 314 may be further classified by its respective neural network during deployment.

Initially, at S710, it is determined whether the static code issue is a syntactical static code issue 108 or a non-syntactical issue 110 via the trained classification neural network model 114. In a case it is determined at S710, the static code issue exhibited by the code fragment 314 is a syntactical static code issue 108, the trained syntactical neural network model 116 may determine at S712 whether the resolution 119 may be an automatic resolution. As used herein, an "automatic resolution" may be a recommendation for fixing the issue by optimizing the code fragments using the change recommended by the framework. The automatic resolution may be used for automatic naming, modification/deletion/addition of some specific statements in code in order to remove the static code issue. The trained syntactical neural network model 116 may have been trained to classify a resolution as an "automatic resolution," in a similar training manner to that described above. In a case it is decided at S712 the resolution is an automatic resolution, the trained syntactical neural network model 116 may, at S714, automatically generate an instruction including the output resolution so that the resolution may be automatically implemented, per the instruction, in the code via the framework, without further action from a user. In some embodiments, the automatic resolution may be displayed for a user in addition to being automatically implemented.

In one or more embodiments, during training of the syntactical neural network model 116, to classify a resolution as an "automatic resolution," reviewers 430 may group resolutions such that an automatic resolution to a particular syntactical static code issue may be identified and suggested/implemented. In embodiments, groups may be used to categorize issues and enhance recommendations, as well as to enhance the speed of recommendation in a case that a similar case is found during analysis. The automatic resolution may be one that does not involve the introduction of a new variable or an external API/method call (e.g., renaming of variables to follow new programming code conventions, removal of statements, removal of unused variables, replacement of old syntax with newly introduced language syntax, etc.). Another automatic resolution may be provided in a case where the introduction of a new variable is predictable, such as a pattern that may be established on the type of new variables being introduced (e.g., adding try/catch statements, other missing statements in code).

Figure 8:
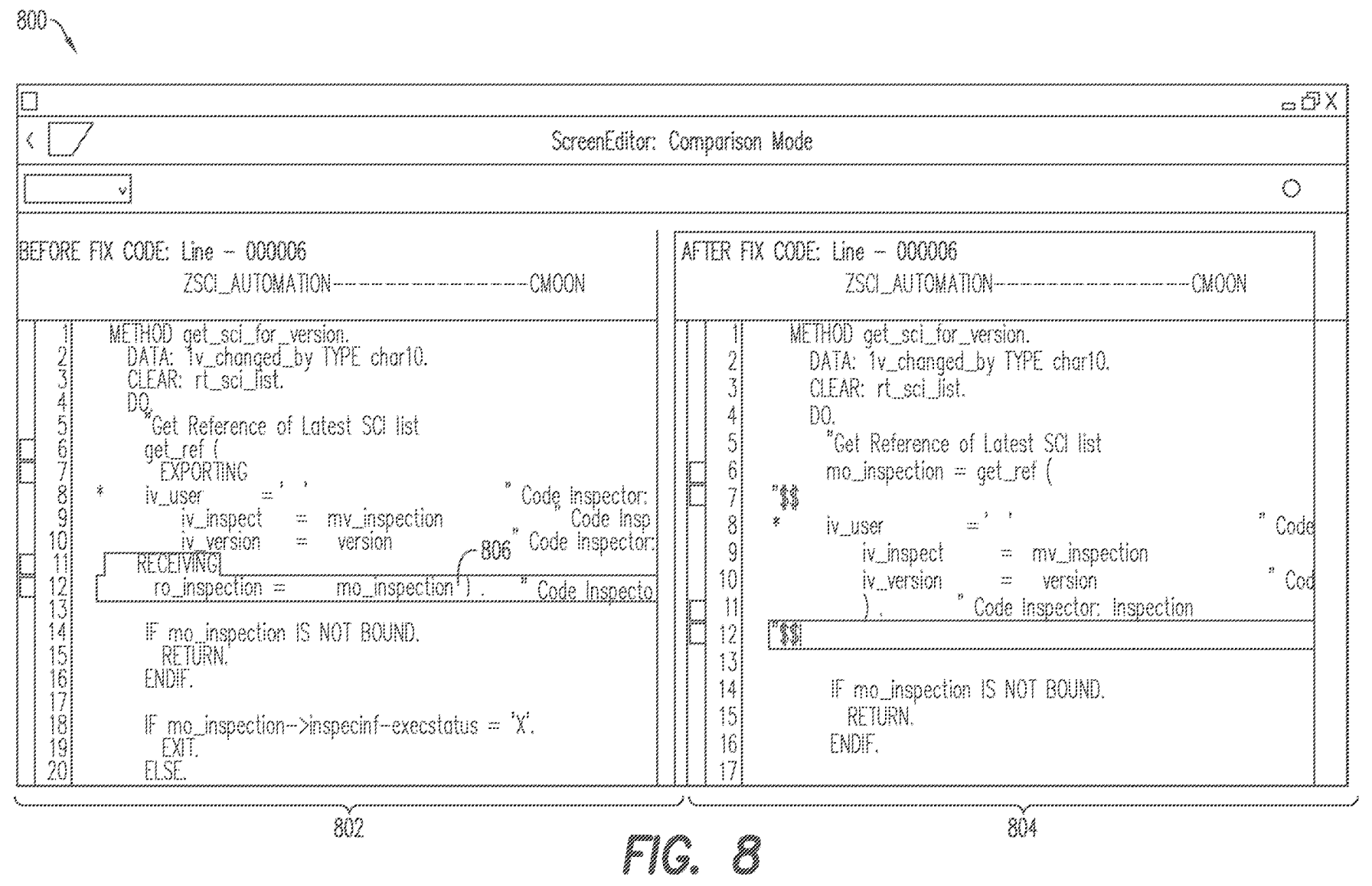

In a case it is decided at S712 the resolution is not an automatic resolution, the process 700 may proceed to S716 and all of the appropriate resolutions implemented in the past are made available for viewing. In one or more embodiments, an appropriate resolution may be based on the type of issue. As part of the training of the syntactical neural network model 116, the issue may be assigned to a particular cluster that represents a type of issue. In the case the resolution is not automatic, the syntactical neural network model 116 may retrieve all of the resolutions for the particular cluster to which the issue is assigned. In these instances, a user interface 800 may be provided, as shown in FIG. 8 to display a "Before" version 802 and an "After" version 804 of the code, highlighting the differences between an issue ("Before") and a resolution ("After"). For example, the non-exhaustive example in FIG. 8 describes a scenario where the code is fixed by the framework, and in particular, where logic is corrected for better maintenance. In the "Before" code 902 there is a code fragment 806 "RECEIVING ro_inspection=mo_inspection). The resolution for issue represented by this highlighted code was recorded and is displayed in the "After" code 804 as "optimized version of the code". In one or more embodiments, the static code issues may be highlighted in-line in the source code as shown in FIG. 8. The user may be able to see all the proposed solutions in the system, apply the proposed solution (in some instances) and take exemptions with appropriate exemption reasons (if available). In one or more embodiments, developers/reviewers may vote on what they think is the most relevant resolution, thereby enhancing subsequent usages.

In a case it is determined at S710, the static code issue 314 is a non-syntactical static code issue 110, the process 700 proceeds to S718 and it is determined whether a resolution is available for proposal to the user ("resolution proposal") 120. In one or more embodiments, the trained non-syntactical neural network model 118 may be trained to prepare a resolution proposal 120 for display to a user. For non-syntactical issues involving program structure changes, the sets of issues and respective resolutions may be assigned to a particular cluster based on issue type during training of the neural network. The clustering may facilitate the proposal of a particular program structure to the user/developer, when the trained non-syntactical neural network model 118 is deployed. For example, during deployment, when an issue type for a given issue matches the issue type in a particular cluster, the trained non-syntactical neural network model 118 retrieves the resolution associated with that issue. In embodiments, in a case that the resolution is accepted by the user, the resolution may be marked as a best resolution, and in a case that the resolution is not accepted by the user, a new proposal may be recommended. In some embodiments, the marking of the resolution may maintain the context of the issue to be fixed. Non-exhaustive examples of this type of clustered resolutions are moving a Select outside the loop, extracting a new method for method complexity, extracting a new class for class complexity.

In a case it is determined at S718 that a resolution proposal 120 is available, the resolution proposal 120 may be generated at S720 and displayed for a user on a user interface.

In a case it is determined at S718 that a resolution proposal 120 is not available, the process may proceed to S722 and the system 100 may provide a plurality of proposed resolutions on the UI.

In some embodiments, more than one program structure may be proposed to the user, as there may be more than one way to resolve an issue. The system 100 may list the most-used-resolution on top and then display the other resolutions in descending order of use. As a non-exhaustive example, the resolution proposal in code is the code 804 shown in FIG. 8. It is noted that the resolution may be in a form other than code. While the display described herein is in terms of descending order, other suitable display hierarchies are available. Additionally, in some embodiments, the format (e.g., bold, different font-size, etc.) of the resolution may be used to distinguish a most-used-resolution.

Figure 9:
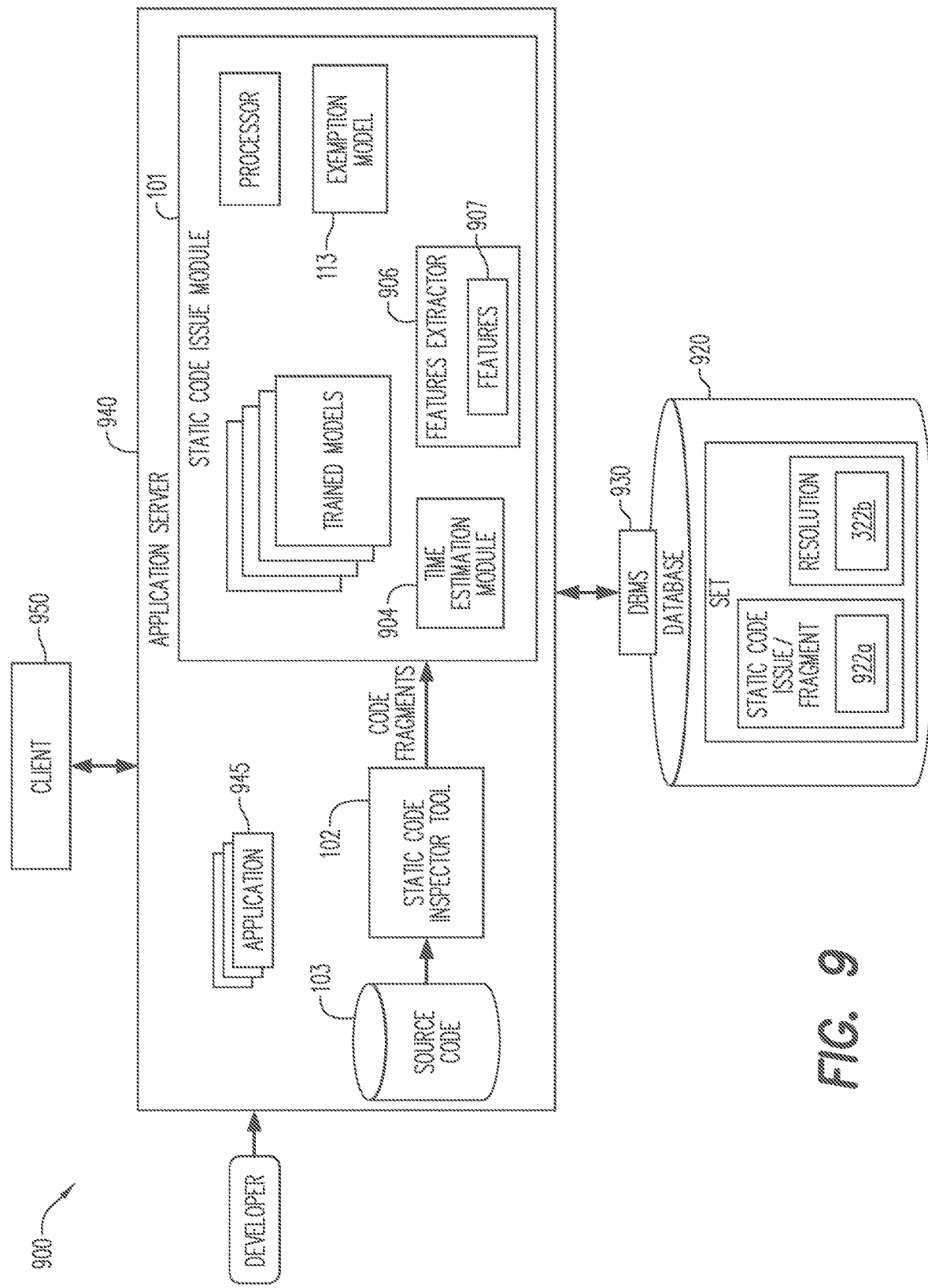
FIG. 9 illustrates a system according to some embodiments.

FIG. 9 is a block diagram of system architecture 900 according to some embodiments. Embodiments are not limited to architecture 900 or to a three-tier storage architecture. One or more components of the system architecture 900 may be located remote from one another and one or more components may be allocated in a cloud-computing environment. Such a cloud computing environment may elastically allocate and de-allocate compute (e.g., virtual machines) and storage (e.g., file-based, block-based, object-based) resources depending on demand, cost and/or other factors.

Architecture 900 includes a static code issue module 101, a database 1020, a database management system (DBMS) 930, an application server 940, application(s) 945, and clients 950. Applications 945 may comprise server-side executable program code (e.g., compiled code, scripts, etc.) executing within application server 940 to receive queries/requests from clients 950 and provide results (proposed resolution) to clients 950 based on data of database 920 and the output of the static code issue module 101. A client 950 may access the static code issue module 101 executing within application server 940, to generate the user interfaces 800 to display resolutions to the user for static code issues.

In one or more embodiments, the static code issue module 101 may include a time estimation module 904. The time estimation module 904 may calculate an estimated time for resolving a static code issue. The calculation may be based on the difference between the time stamps on the training data that are recorded at the occurrence of the static code issue 922a and the time stamp of the resolution 922b. In one or more embodiments, the calculation may account for noise, such as a weekend or holiday that separates the two time stamps. The estimated time to resolve the static code issue may be useful for resource planning, as well as selecting a resolution, in some instances.

Application server 940 provides any suitable interfaces through which the clients 1050 may communicate with the static code issue module 101 or applications 945 executing on application server 940. For example, application server 940 may include a HyperText Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

One or more applications 945 executing on server 940 may communicate with DBMS 930 using database management interfaces such as, but not limited to, Open Database Connectivity (ODBC) and Java Database Connectivity (JDBC) interfaces. These types of applications 945 may use Structured Query Language (SQL) to manage and query data stored in database 920.

DBMS 930 serves requests to retrieve and/or modify data of database 920, and also performs administrative and management functions. Such functions may include snapshot and backup management, indexing, optimization, garbage collection, and/or any other database functions that are or become known. DBMS 930 may also provide application logic, such as database procedures and/or calculations, according to some embodiments. This application logic may comprise scripts, functional libraries and/or compiled program code. DBMS 930 may comprise any query-responsive database system that is or becomes known, including but not limited to a structured-query language (i.e., SQL) relational database management system.

Application server 940 may be separated from, or closely integrated with, DBMS 930. A closely integrated application server 940 may enable execution of server applications 945 completely on the database platform, without the need for an additional application server. For example, according to some embodiments, application server 940 provides a comprehensive set of embedded services which provide end-to-end support for Web-based applications. The services may include a lightweight web server, configurable support for OData, server-side JavaScript execution and access to SQL and SQLScript.

Application server 940 may provide application services (e.g., via functional libraries) which applications 945 may use to manage and query the data of database 920. The application services can be used to expose the database data model, with its tables, hierarchies, views and database procedures, to clients. In addition to exposing the data model, application server 940 may host system services such as a search service.

Database 920 may store data used by at least one of: applications 945 and the static code issue module 101. For example, database 920 may store one or more tables/maps accessed by the static code issue module 101 during execution thereof.

Generally, the system architecture 900 manages data of a database instance which is persisted in the database 920. The database 920 may be stored on-premise or on a cloud platform. Embodiments may utilize more than one database. In some embodiments, the database may utilize one or more block storage devices and/or object store. As is known in the art, block storage device persists system files and database pages which belong to any file-based database spaces managed by the system architecture 900. Object store, on the other hand, persists database pages which belong to any cloud-based database spaces managed by the system architecture 900. Database 920 may comprise any query-responsive data source or sources that are or become known, including but not limited to a structured-query language (SQL) relational database management system. Database 920 may comprise a relational database, a multi-dimensional database, an extensible Markup Language (XML) document, or any other data storage system storing structured and/or unstructured data. The data of database 920 may be distributed among several relational databases, dimensional databases, and/or other data sources. Embodiments are not limited to any number or types of data sources.

In some embodiments, the data of database 920 may comprise one or more of conventional tabular data, row-based data, column-based data, and object-based data. Moreover, the data may be indexed and/or selectively replicated in an index to allow fast searching and retrieval thereof. Database 920 may support multi-tenancy to separately support multiple unrelated clients by providing multiple logical database systems which are programmatically isolated from one another.

Database 920 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently used data) and one or more fixed disks (e.g., persistent memory for storing their respective portions of the full database).

Client 950 may comprise one or more individuals or devices executing program code of a software application for presenting and/or generating user interfaces to allow interaction with application server 940. Presentation of a user interface as described herein may comprise any degree or type of rendering, depending on the type of user interface code generated by application server 940.

For example, a client 950 may execute a Web Browser to request and receive a Web page (e.g., in HTML format) from a website application 945 of application server 940 to provide the UI 800 via HTTP, HTTPS, and/or Web Socket, and may render and present the Web page according to known protocols. The client 950 may also or alternatively present user interfaces by executing a standalone executable file (e.g., an .exe file) or code (e.g., a JAVA applet) within a virtual machine.

Figure 11:
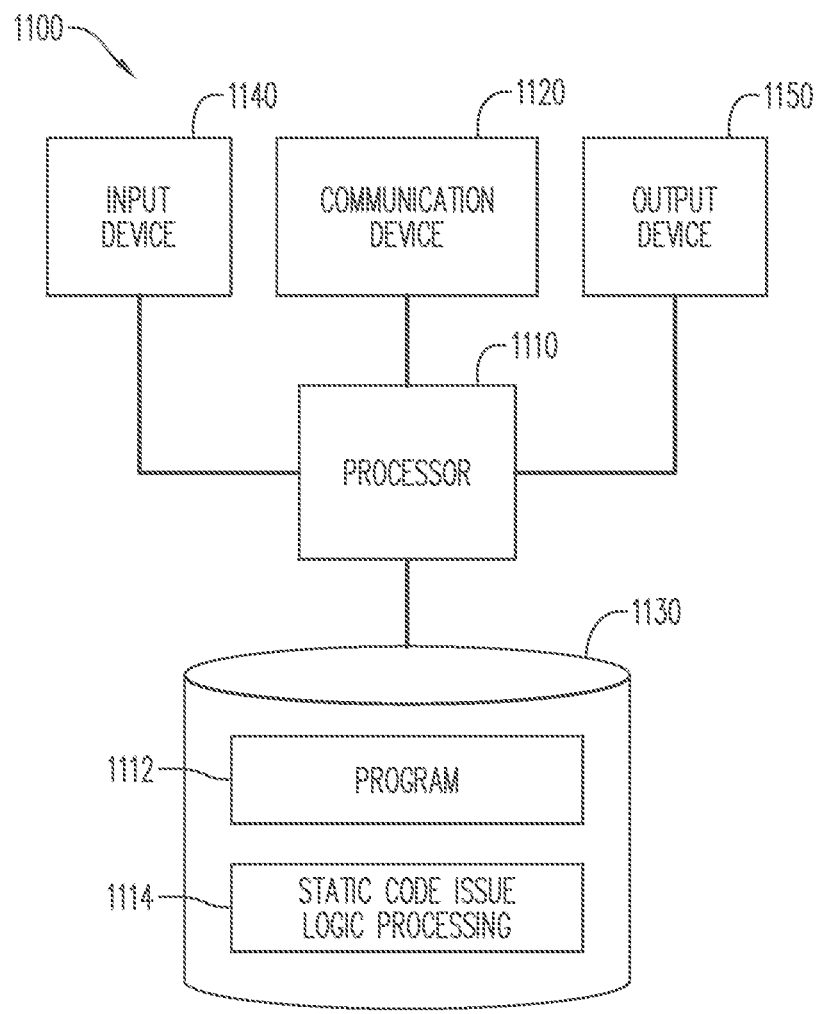
FIG. 11 is a block diagram of a system according to some embodiments.

FIG. 11 is a block diagram of apparatus 1100 according to some embodiments. Apparatus 1100 may comprise a general- or special-purpose computing apparatus and may execute program code to perform any of the functions described herein. Apparatus 1100 may comprise an implementation of one or more elements of system 900. Apparatus 1100 may include other unshown elements according to some embodiments.

Apparatus 1100 includes static code issue processor 1110 operatively coupled to communication device 1120, data storage device 1130, one or more input devices 1140, one or more output devices 1150 and memory 1160. Communication device 1120 may facilitate communication with external devices, such as application server 940. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to manipulate graphical user interfaces and to input information into apparatus 1100. Output device(s) 1150 may comprise, for example, a display (e.g., a display screen) a speaker, and/or a printer.

Data storage device/memory 1130 may comprise any device, including combinations of magnetic storage devices (e.g., magnetic tape, hard disk drives and flash memory), optical storage devices, Read Only Memory (ROM) devices, Random Access Memory (RAM), cloud platforms (e.g., cloud object stores, cloud-based block storage devices) etc.

The storage device 1130 stores a program 1112 and/or static code issue platform logic 1114 for controlling the processor 1110. The processor 1110 performs instructions of the programs 1112, 1114, and thereby operates in accordance with any of the embodiments described herein, including but not limited to process 200/700.

The programs 1112, 1114 may be stored in a compressed, uncompiled and/or encrypted format. The programs 1112, 1114 may furthermore include other program elements, such as an operating system, a database management system, and/or device drivers used by the processor 1110 to interface with peripheral devices.

The foregoing diagrams represent logical architectures for describing processes according to some embodiments, and actual implementations may include more, or different components arranged in other manners. Other topologies may be used in conjunction with other embodiments. Moreover, each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 900 may include a processor to execute program code such that the computing device operates as described herein.

All systems and processes discussed herein may be embodied in program code stored on one or more computer-readable non-transitory media. Such non-transitory media may include, for example, cloud computing, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
a memory storing processor-executable steps; and
a processor to execute the processor-executable steps to cause the system to:
receive a code fragment exhibiting a static code issue;
determine, via a trained exemption neural network, whether the received code fragment is exempt or not exempt from resolution, wherein an exempt code fragment includes a static code issue that does not need to be resolved;
in a case it is determined the code fragment is not exempt from resolution, input the code fragment to a trained classification neural network;
determine, via the trained classification network, whether the static code issue exhibited by the code fragment is a syntactical static code issue or a non-syntactical static code issue;
in a case the static code issue exhibited by the code fragment is a syntactical static code issue, input the code fragment to a first trained network to generate a first resolution of the syntactical static code issue; and
in a case the static code issue exhibited by the code fragment is a non-syntactical static code issue, input the code fragment to a second trained network to generate a second resolution of the non-syntactical static code issue.

2. The system of claim 1, further comprising processor-executable steps to cause the system to:
in a case it is determined the code fragment is exempt, provide an exemption reason via an exemption model.

3. The system of claim 1, further comprising processor-executable steps to cause the system to:
in a case it is determined the static code issue exhibited by the code fragment is the syntactical static code issue, determine an availability of an automatic resolution.

4. The system of claim 3, further comprising processor-executable steps to cause the system to:
in a case it is determined the automatic resolution is available,
generate an instruction to resolve the syntactical static code issue; and
automatically resolve the syntactical static code issue based on the instruction.

5. The system of claim 3, further comprising processor-executable steps to cause the system to:
in a case it is determined the automatic resolution is unavailable, provide a plurality of clustered resolutions associated with the received static code issue.

6. The system of claim 1, further comprising processor-executable steps to cause the system to:
in a case it is determined the static code issue exhibited by the code fragment is the non-syntactical issue, determine an availability of at least one proposed resolution.

7. The system of claim 6, further comprising processor-executable steps to cause the system to:
in a case it is determined at least one proposed resolution is available, generate the at least one proposed resolution.

8. The system of claim 1, further comprising processor-executable steps to cause the system to:
train the classification neural network prior to receiving the code fragment exhibiting the static code issue.

9. The system of claim 8, wherein training the classification neural network further comprises processor-executable steps to cause the system to:
acquire a plurality of sets of static code issues-resolutions from a storage device, each set including a training code fragment exhibiting a static code issue, a resolution for the static code issue, and a time stamp for each static code issue and each resolution for the static code issue;
generate a set of features based on the plurality of sets;
input each set of features to the classification neural network to generate a proposed resolution;
determine a loss by comparing each generated proposed resolution associated with a respective static code issue with the acquired resolution; and
modify the classification neural network based on the loss, wherein the modified classification neural network is a trained classification neural network adapted to classify the received static code issue as a syntactical static code issue or a non-syntactical static code issue.

10. The system of claim 9, wherein the classification neural network is a classifier.

11. The system of claim 1, wherein the classification neural network is a regression model.

12. The system of claim 9, further comprising processor-executable steps to cause the system to:
  determine an estimated time to resolve each static code issue based on the time stamp for each of the static code issue and resolution in the set.

13. The system of claim 1, wherein the resolution is one of: an automatic resolution, a proposed resolution, and a listing of two or more resolutions.

14. A computer-implemented method comprising:
  receiving a code fragment exhibiting a static code issue;
  determining, via a trained exemption neural network, whether the received code fragment is exempt or not exempt from resolution, wherein an exempt code fragment includes a static code issue that does not need to be resolved;
  in a case it is determined the code fragment is not exempt from resolution, input the code fragment to a trained classification neural network;
  determining, via the trained classification network, whether the static code issue exhibited by the code fragment is a syntactical static code issue or a non-syntactical static code issue; and
  generating a resolution to one of the determined syntactical static code issue and the non-syntactical static code issue, wherein the resolution is one of: an automatic resolution, a proposed resolution and a listing of two or more resolutions.

15. The computer-implemented method of claim 14, further comprising:
  training the classification neural network prior to receiving the code fragment exhibiting the static code issue.

16. The computer-implemented method of claim 14, wherein training the classification neural network further comprises:
  acquiring a plurality of sets of static code issues-resolutions from a storage device, each set including a training code fragment exhibiting a static code issue, a resolution for the static code issue, and a time stamp for each static code issue and each resolution for the static code issue;
  generating a set of features based on the plurality of sets;
  inputting each set of features of the classification neural network to generate a proposed resolution;
  determining a loss by comparing each generated proposed resolution associated with a respective static code issue with the acquired resolution; and
  modifying the classification neural network based on the loss, wherein the modified classification neural network is a trained classification neural network adapted to classify the received static code issue as a syntactical static code issue or a non-syntactical static code issue.

17. The computer-implemented method of claim 16, further comprising:
  determining an estimated time to resolve each static code issue based on the time stamp for each of the static code issue and resolution in the set.

18. The computer-implemented method of claim 16 wherein a language grammar-related change is classified as a syntactical static code issue, and a program structure change or non-language grammar-related change is classified as a non-syntactical static code issue.

19. A non-transitory computer-readable memory storing program code, the program code executable by a computer system to cause the computer system to:
  receive a code fragment exhibiting a static code issue;
  determine, via a trained exemption neural network, whether the received code fragment is exempt or not exempt from resolution, wherein an exempt code fragment includes a static code issue that does not need to be resolved;
  in a case it is determined the code fragment is not exempt from resolution, input the code fragment to a trained classification neural network;
  determine, via the trained classification network, whether the static code issue exhibited by the code fragment is a syntactical static code issue or a non-syntactical static code issue; and
  generate a resolution to one of the determined syntactical static code issue and the non-syntactical static code issue.

20. The non-transitory computer-readable memory of claim 19, wherein the resolution is one of an automatic resolution, a proposed resolution, and a listing of two or more resolutions.

* * * * *